(12) United States Patent
Stolfo et al.

(10) Patent No.: US 10,038,704 B2
(45) Date of Patent: *Jul. 31, 2018

(54) SYSTEMS AND METHODS FOR CORRELATING AND DISTRIBUTING INTRUSION ALERT INFORMATION AMONG COLLABORATING COMPUTER SYSTEMS

(71) Applicant: The Trustees of Columbia University in the City of New York, New York, NY (US)

(72) Inventors: Salvatore J. Stolfo, Ridgewood, NJ (US); Tal Malkin, New York, NY (US); Angelos D. Keromytis, New York, NY (US); Vishal Misra, New York, NY (US); Michael Locasto, Springfield, VA (US); Janak Parekh, Manhasset, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/846,188

(22) Filed: Sep. 4, 2015

(65) Prior Publication Data

US 2015/0381639 A1  Dec. 31, 2015

Related U.S. Application Data

(63) Continuation of application No. 13/743,232, filed on Jan. 16, 2013, now Pat. No. 9,135,438, which is a
(Continued)

(51) Int. Cl.
*H04L 29/06* (2006.01)
*G06F 21/55* (2013.01)

(52) U.S. Cl.
CPC ........ *H04L 63/1416* (2013.01); *G06F 21/552* (2013.01); *G06F 21/554* (2013.01);
(Continued)

(58) Field of Classification Search
None
See application file for complete search history.

(56) References Cited

U.S. PATENT DOCUMENTS 5,621,889 A   4/1997   Lermuzeuaux et al.
5,812,763 A   11/1998  Teng
(Continued)

FOREIGN PATENT DOCUMENTS

CA      2470454        6/2004
WO   WO/2003/029934    4/2003

OTHER PUBLICATIONS

Katti et al., M&M: A Passive Toolkit for Measuring, Correlating, and Tracking Path Characteristics, Apr. 15, 2004, MIT Technical Report, 13 total pages.*
(Continued)

*Primary Examiner* — Farid Homayounmehr
*Assistant Examiner* — Christopher C Harris
(74) *Attorney, Agent, or Firm* — Byrne Poh LLP

(57) ABSTRACT

Systems and methods for correlating and distributing intrusion alert information among collaborating computer systems are provided. These systems and methods provide an alert correlator and an alert distributor that enable early signs of an attack to be detected and rapidly disseminated to collaborating systems. The alert correlator utilizes data structures to correlate alert detections and provide a mechanism through which threat information can be revealed to other collaborating systems. The alert distributor uses an efficient technique to group collaborating systems and then pass data between certain members of those groups accord-
(Continued)

ing to a schedule. In this way data can be routinely distributed without generating excess traffic loads.

12 Claims, 12 Drawing Sheets

Related U.S. Application Data continuation of application No. 12/833,743, filed on Jul. 9, 2010, now Pat. No. 8,381,295, which is a continuation of application No. 10/864,226, filed on Jun. 9, 2004, now Pat. No. 7,779,463.

(60) Provisional application No. 60/570,349, filed on May 11, 2004.

(52) U.S. Cl.
CPC ........ *H04L 63/145* (2013.01); *H04L 63/1475* (2013.01); *H04L 63/1491* (2013.01)

(56) References Cited

U.S. PATENT DOCUMENTS

| | | |
|---|---|---|
| 5,919,257 A | 7/1999 | Trostle |
| 5,919,258 A | 7/1999 | Kayashima et al. |
| 5,920,900 A * | 7/1999 | Poole ............... G06F 17/30949 707/E17.036 |
| 6,016,553 A | 1/2000 | Schneider et al. |
| 6,279,113 B1 | 8/2001 | Vaidya |
| 6,460,055 B1 | 10/2002 | Midgley et al. |
| 6,802,025 B1 | 10/2004 | Thomas et al. |
| 6,804,667 B1 | 10/2004 | Martin |
| 6,957,348 B1 | 10/2005 | Flowers et al. |
| 7,089,303 B2 | 8/2006 | Sheymov et al. |
| 7,146,421 B2 | 12/2006 | Syvanne |
| 7,386,733 B2 | 6/2008 | Yoon et al. |
| 7,406,713 B2 | 7/2008 | Sheymov et al. |
| 7,444,515 B2 | 10/2008 | Dharmapurikar et al. |
| 7,752,665 B1 | 7/2010 | Robertson et al. |
| 7,913,303 B1 | 3/2011 | Rouland et al. |
| 2002/0059078 A1 | 5/2002 | Valdes et al. |
| 2003/0159069 A1* | 8/2003 | Choi ...................... G06F 21/552 726/23 |
| 2003/0167404 A1 | 9/2003 | Han et al. |
| 2003/0172282 A1 | 9/2003 | Jiang |
| 2003/0208665 A1* | 11/2003 | Peir ......................... G06F 9/383 711/169 |
| 2004/0123155 A1* | 6/2004 | Etoh ................... H04L 63/1441 726/23 |
| 2004/0199579 A1 | 10/2004 | Straw |
| 2005/0044406 A1 | 2/2005 | Stute |
| 2005/0108368 A1 | 5/2005 | Mohan et al. |
| 2005/0108568 A1 | 5/2005 | Bussiere et al. |
| 2005/0166046 A1* | 7/2005 | Bellovin ............... H04L 9/3218 713/165 |
| 2005/0229254 A1 | 10/2005 | Singh et al. |

OTHER PUBLICATIONS

Abdelsayed, S. et al., "An Efficient Filter for Denial-of-Service Bandwith Attacks", In Proceedings of the Global Telecommunications Conference (GLOBECOM '03), vol. 3, San Francisco, CA, US, Dec. 1-5, 2003, pp. 1353-1357.

Balasubramaniyan, J.S. et al., "An Architecture for Intrusion Detection using Autonomous Agents", In Proceedings of the 14th Annual Computer Security Applications Conference (ACSAC '98), Scottsdale, AZ, US, Dec. 7-11, 1998, pp. 13-24.

Ben-Or, M. et al., "Completeness Theorems for Non-Cryptographic Fault-Tolerant Distributed Computations", In Proceedings of the 20th Annual ACM Symposium on Theory of Computing (STOC '88), Chicago, IL, US, May 2-4, 1988, pp. 1-10.

Bloom, B.H., "Space/Time Trade-Offs in Hash Coding with Allowable Errors", In Communications of the ACM, vol. 13, No. 7, Jul. 1970, pp. 422-426.

Broder, A. and Mitzenmacher, M., "Network Applications of Bloom Filters: A Survey", Internet Mathematics, vol. 1, No. 4, Apr. 2003, pp. 485-509.

Chang, H.Y.,"On Real-Time Intrusion Detection and Source Identification", Ph.D. Dissertation, Department of Electrical Engineering, North Carolina State University, Jan. 2001, pp. 1-150.

Chaum, D. et al., "Multiparty Unconditionally Secure Protocols", Extended Abstract, In Proceedings of the 20th Annual ACM Symposium on Theory of Computing, Chicago, IL, US, May 2-4, 1988, pp. 11-19.

Cheung, S. and Levitt, K.N., "Protecting Routing Infrastructures from Denial of Service Using Cooperative Intrusion Detection", In Proceedings of the Workshop on New Security Paradigms (NSPW '97), Langdale, CMA, GB, Sep. 23-26, 1997, pp. 94-106.

Chun, B. et al., "Netbait: A Distributed Worm Detection Service", Technical Report IRB-TR-03-033, Intel Research Berkeley, Intel Corporation, Sep. 2003, pp. 1-12.

Costa, M. et al., "Can We Contain Internet Worms?", Technical Report MSR-TR-2004-83, Microsoft Corporation, Aug. 2004, pp. 1-6.

Cuppens, F. and Miege, A., "Alert Correlation in a Cooperative Intrusion Detection Framework", In Proceedings of the IEEE Symposium on Security and Privacy (S&P '02), Oakland, CA, US, May 12-15, 2002, pp. 202-215.

Cuppens, F. and Ortalo, R., "LAMBDA: A Language to Model a Database for Detection of Attacks", In Proceedings of the 3rd International Workshop on Recent Advances in Intrusion Detection (RAID '00), Toulouse, FR, Oct. 2-4, 2000, pp. 197-216.

Dain, O. and Cunningham, R.K., "Fusing a Heterogeneous Alert Stream Into Scenarios", Technical Report, Massachusetts Institute of Technology, Dec. 18, 2001, pp. 1-13.

Dharmapurikar, S. et al., "Deep Packet Inspection Using Parallel Bloom Filters", In IEEE Micro, vol. 24, No. 1, Jan.-Feb. 2004, pp. 52-61.

Du, W. and Atallah, M.J., "Secure Multi-Party Computation Problems and their Applications: A Review and Open Problems", In Proceedings of the New Security Paradigms Workshop (NSPW '01), Cloudcroft, NM, US, Sep. 10-13, 2001, pp. 11-20.

Fenet, S. and Hassas, S., "A Distributed Intrusion Detection and Response System Based on Mobile Autonomous Agents Using Social Insects Communication Paradigm", In Electronic Notes in Theoretical Computer Science, vol. 63, May 2002, pp. 41-58.

Frincke, D. et al., "A Framework for Cooperative Intrusion Detection", In Proceedings of the 21st National Information Systems Security Conference (NISSC '98), Arlington, VA, US, Oct. 5-8, 1998, pp. 361-373.

Goldreich, O. et al., "How to Play Any Mental Game", In Proceedings of the 19th Annual ACM Symposium on Theory of Computing (STOC '87), New York, NY, US, May 25-27, 1987, pp. 218-229.

Huang, M.Y. and Wicks, T.M., "A Large-Scale Distributed Intrusion Detection Framework Based on Attack Strategy Analysis", Technical Report, Applied Research and Technology, The Boeing Company, Sep. 1998, pp. 1-12.

Huang, Y. and Lee, W., "A Cooperative Intrusion Detection System for Ad Hoc Networks", In Proceedings of the 1st ACM Workshop on Security of Ad Hoc and Sensor Networks (SASN '03), Fairfax, VA, US, Oct. 2003, pp. 135-147.

Huebsch, R. et al.,"Querying the Internet with PIER", In Proceedings of the 29th International Conference on Very Large Data Bases (VLDB '03), vol. 29, Berlin, DE, Sep. 9-12, 2003, pp. 321-332.

Kahn, C. et al., "A Common Intrusion Detection Framework", Technical Report, Jul. 15, 1998, pp. 1-17.

King, S.T. and Chen, P.M., "Backtracking Intrusions", In Proceedings of the 19th ACM Symposium on Operating Systems Principles 2003 (SOSP '03), Bolton Landing, NY, US, Oct. 19-22, 2003, pp. 223-236.

Kodialam, M. and Lakshman, T.V., "Detecting Network Intrusions via Sampling: A Game Theoretic Approach", In Proceedings of the

(56) References Cited

OTHER PUBLICATIONS

22nd Annual Joint Conference of the IEEE Computer and Communications Societies (INFOCOM '03), San Franciso, CA, US, Mar. 30-Apr. 3, 2003, pp. 1-10.

Krugel, C. et al., "Decentralized Event Correlation for Intrusion Detection", In Proceedings of the International Conference on Information Security and Cryptology (ICISC '01), Seoul, KR, Dec. 6-7, 2001, pp. 114-131.

Lincoln, P. et al., "Privacy-Preserving Sharing and Correlation of Security Alerts", In Proceedings of the 13th USENIX Security Symposium (SSYM '04), vol. 3, San Diego, CA, US, Aug. 9-13, 2004, pp. 239-254.

Locasto, M.E. et al., "Collaborative Distributed Intrusion Detection", Technical Report CUCS-012-04, Department of Computer Science, Columbia University, Mar. 8, 2004, pp. 1-18.

Moore, D. et al., "Internet Quarantine: Requirements for Containing Self-Propagating Code", In IEEE Societies Twenty-Second Annual Joint Conference of the IEEE Computer and Communications, vol. 3, Mar. 30-Apr. 3, 2003, pp. 1901-1910.

Ning, P. et al., "Constructing Attack Scenarios Through Correlation of Intrusion Alerts", In Proceedings of the 9th ACM Conference on Computer and Communications Security (CCS D2) Washington, DC, USA, Nov. 18-22, 2002, pp. 245-254.

Office Action dated Jan. 11, 2008 in U.S. Appl. No. 10/996,574.
Office Action dated May 13, 2009 in U.S. Appl. No. 10/864,226.
Office Action dated Jun. 24, 2009 in U.S. Appl. No. 10/996,574.
Office Action dated Jul. 12, 2012 in U.S. Appl. No. 12/837,302.
Office Action dated Aug. 27, 2008 in U.S. Appl. No. 10/864,226.
Office Action dated Aug. 27, 2014 in U.S. Appl. No. 13/743,232.
Office Action dated Sep. 1, 2011 in U.S. Appl. No. 12/833,743.
Office Action dated Oct. 6, 2008 in U.S. Appl. No. 10/996,574.
Office Action dated Oct. 20, 2011 in U.S. Appl. No. 12/837,302.
Office Action dated Nov. 14, 2013 in U.S. Appl. No. 13/743,232.
Office Action dated Dec. 10, 2007 in U.S. Appl. No. 10/864,226.

Porras, P.A. and Neumann, P.G., "EMERALD: Event Monitoring Enabling Responses to Anomalous Live Disturbances", In Proceedings of the 20th National Information Systems Security Conference (NISSC '97), Baltimore, MD, US, Oct. 7-10, 1997, pp. 353-365.

Qin, X. and Wenke, L., "Statistical Causality Analysis of INFOSEC Alert Data", In Proceedings of the 6th International Symposium Recent Advances in Intrusion Detection (RAID '03), Pittsburgh, PA, US, Sep. 8-10, 2003, pp. 73-93.

Robertson, S. et al., "Surveillance Detection in High Bandwidth Environments", In Proceedings of the 3rd DARPA Information Survivability Conference and Exposition (DISCEX-III 2003), vol. 1, Washington, DC, US, Apr. 22-24, 2003, pp. 130-138.

Roesch, M., "Snort: Lightweight Intrusion Detection for Networks", In Proceedings of the 13th Conference on Systems Administration (LISA '99), Seattle, WA, US, Nov. 7-12, 1999, pp. 229-238.

Schaelicke, L. et al., "Improving the Database Logging Performance of the Snort Network Intrusion Detection Sensor", Technical Report 03-10, Department of Computer Science and Engineering, University of Notre Dame, Nov. 2002, pp. 1-5.

Shanmugasundaram, K. et al., "ForNet: A Distributed Forensics Network", In Lecture Notes in Computer Science, vol. 2776, Nov. 2003, pp. 1-16.

Shannon, C. and Moore, D., "The Spread of the Witty Worm", Technical Report, Mar. 2004, pp. 1-9, available at: http://www.caida.org/research/security/witty/index.xml.

Snoeren, A.G. et al., "Hash-Based IP Traceback", In Proceedings of the 2001 Conference on Applications, Technologies, Architectures, and Protocols for Computer Communications (SIGCOMM '01), San Diego, CA, US, Aug. 27-31, 2001, pp. 3-14.

Snoeren, A.G. et al., "Single-Packet IP Traceback", In IEEE/ACM Transactions on Networking, vol. 10, No. 6, Dec. 2002, pp. 721-734.

Sterne, D. et al., "Autonomic Response to Distributed Denial of Service Attacks", In Proceedings of the 4th International Symposium on Recent Advances in Intrusion Detection (RAID '01), Davis, CA, US, Oct. 10-12, 2001, pp. 134-149.

Stoica, I. et al., "Chord: A Scalable Peer-to-Peer Lookup Service for Internet Application", In Proceedings of the 2001 Conference on Applications, Technologies, Architectures, and Protocols for Computer Communications (SIGCOMM '01), San Diego, CA, US, Aug. 27-31, 2001, pp. 149-160.

Stolfo, S.J., "Worm and Attack Early Warning: Piercing Stealthy Reconnaissance", In IEEE Security & Privacy Magazine, vol. 2, No. 3, May/Jun. 2004, pp. 73-75.

System Detection, Inc., "System Detection Delivers Antura Vision", Business Wire, Sep. 8, 2003, pp. 1-3.

U.S. Appl. No. 10/996,574, filed Nov. 24, 2004.
U.S. Appl. No. 12/837,302, filed Jul. 15, 2010.
U.S. Appl. No. 60/551,732, filed Mar. 9, 2004.
U.S. Appl. No. 60/518,742, filed Nov. 12, 2003.

Wang, K. and Stolfo, S.J., "Anomalous Payload-Based Network Intrusion Detection", In Proceedings of the 7th International Symposium on Recent Advances in Intrusion Detection (RAID '04), Sophia Antipolis, FR, Sep. 15-17, 2004, pp. 203-222.

White, G.B. et al., "Cooperating Security Managers: A Peer-Based Intrusion Detection System", In IEEE Network, vol. 10, No. 1, Jan./Feb. 1996, pp. 20-23.

Wise, M., "Windows XP System Restore", Microsoft TechNet, Windows & NET Magazine, Dec. 4, 2002, pp. 1-4, available at: http://www.windowsitpro.com/magazine/.

Wu, Y.S. et al., "Collaborative Intrusion Detection System (CIDS): a Framework for Accurate and Efficient IDS", In Proceedings of the 19th Annual Computer Security Applications Conference (ACSAC '03), Las Vegas, NV, US, Dec. 8-12, 2003 pp. 234-244.

Yang, J. et al., "CARDS: A Distributed System for Detecting Coordinated Attacks", In Proceedings of the 15th Annual Working Conference on Information Security, Beijing, CN, Aug. 22-24, 2000, pp. 171-180.

Yao, A.C., "Theory and Application of Trapdoor Functions", In 23rd Annual Symposium on Foundations of Computer Science, Chicago, IL, US, Nov. 3-5, 1982, pp. 80-91.

Yegneswaran, V. et al., "Global Intrusion Detection in the DOMINO Overlay System", In Proceedings of the Network and Distributed System Security Symposium (NDSS '04), San Diego, CA, US, Feb. 4-5, 2004, pp. 1-17.

Office Action dated Feb. 7, 2011 in Canadian Patent Application No. 2470454.

Office Action dated Mar. 1, 2012 in Canadian Patent Application No. 2470454.

\* cited by examiner

FIG. 6

| B.F # | DESCRIPTION | INPUT |
|---|---|---|
| 1 | ALL C.S. | SOURCE IP ADDR |
| 2 | BANK C.S. | SOURCE IP ADDR |
| 3 | GOV'T C.S. | SIGNATURE |
| 4 | INTERNAL ATTACKS | SIGNATURE |
| 5 | EXTERNAL ATTACKS | SOURCE IP ADDR |
| 6 | PORT 80 | SOURCE IP ADDR |
| 7 | SCAN ALERTS | SOURCE IP ADDR |
| 8 | NON-SCAN ALERTS | SOURCE IP ADDR |
| 9 | LOGIN ATTACKS | SOURCE IP ADDR |
| 10 | TODAY'S ATTACKS | SOURCE IP ADDR |
| 11 | YESTERDAY'S ATTACKS | SOURCE IP ADDR |
| ⋮ | ⋮ | ⋮ |
| n | | |

SYSTEMS AND METHODS FOR CORRELATING AND DISTRIBUTING INTRUSION ALERT INFORMATION AMONG COLLABORATING COMPUTER SYSTEMS

CROSS REFERENCE TO RELATED APPLICATION

This application is a continuation under 35 U.S.C. § 120 of U.S. patent application Ser. No. 13/743,232, filed Jan. 16, 2013, which is a continuation under 35 U.S.C. § 120 of U.S. patent application Ser. No. 12/833,743, filed Jul. 9, 2010, which claims the benefit under 35 U.S.C. § 120 of U.S. patent application Ser. No. 10/864,226, filed Jun. 9, 2004, which claims the benefit under 35 U.S.C. § 119(e) of U.S. Provisional Patent Application No. 60/570,349, filed May 11, 2004, all of which are hereby incorporated by reference herein in their entireties.

BACKGROUND

The present invention relates to computer network security. More particularly, the present invention relates to systems and methods for correlating and distributing intrusion alert information among collaborating computer systems.

Computer viruses, worms, trojans, hackers, malicious executables, network application errors, misuse of computer systems, scans, probes, etc. (collectively hereinafter "threats") are constant menace to all owners, operators, and users of computers connected to public computer networks (such as the Internet) and/or private networks (such as corporate computer networks). These owners, operators, and users (collectively hereinafter "users") include universities, businesses, governments, non-profit organizations, individuals, families, etc. (collectively hereinafter "entities"). These threats are not just an inconvenience to these owners, operators, and users, but also a major economic drain. For example, it has been reported that computer threats caused $13 billion worth of economic losses in the year 2003.

Although many computers are protected by firewalls and antivirus software, these preventative measures are not always adequate. For example, a recently launched worm took advantage of a known vulnerability in a popular firewall technology the day after the public became aware of the vulnerability. Because of the rapid launch of the worm, the patch necessary to correct the vulnerability could not be deployed in time to prevent the attack. Similarly, most antivirus software relies on updates to that software so that signatures of known viruses can be utilized to recognize threats. In the case of a "zero-day" threat (e.g., a threat that has just been launched), most computer systems are completely vulnerable because no known patch or signature update has yet been made available.

Like many non-computer attacks, computer attacks are usually preceded by reconnaissance activity. For example, prior to launching a worm, it may be useful for the nefarious computer user or hacker to identify computers, particular ports, and their associated services subject to a target vulnerability. Because a scan is more likely to go unnoticed, or be ignored, than an attack, the hacker is able to identify a large number of potential targets without detection. Then, when an adequate number of targets have been identified, the hacker can launch the worm against all of the identified targets simultaneously rather than attacking the targets as they are found during scanning. In this way, the hacker can cause greater damage because the distribution of the worm at first detection is likely to be widespread. When performing this reconnaissance, the hacker may scan or probe potential victims at a slow or random rate to avoid detection by the victim. In order to maximize the likelihood of quickly finding targets, the hacker may configure the scanning and probing to scan unrelated potential victims at substantially the same time, but scan related targets only infrequently.

Collaborative security systems wherein multiple systems cooperate to defend against threats may be useful in mitigating some of the exposure caused by random and infrequent scanning and probing. A problem with prior attempts at collaborative security systems, however, is that many entities are unwilling to share information regarding the identity of parties accessing their systems because of legal, public-relations, and competitive reasons. For example, a corporation may be reluctant to reveal the IP address of a suspected hacker to other corporations for fear that the suspected hacker is not in fact a hacker, but instead a valued customer.

Accordingly, it is desirable to provide new systems and methods for collaboratively detecting and defending against scans, probes, viruses, and other threats in a computer network environments.

SUMMARY OF THE INVENTION

In accordance with the present invention, systems and methods for correlating and distributing intrusion alert information among collaborating computer systems are provided. These systems and methods provide an alert correlator and an alert distributor that enable early signs of a threat to be detected and rapidly disseminated among collaborating systems. The alert correlator stores information related to a threat, correlates alert detections, and provides a mechanism through which threat information can be revealed to other collaborating systems. For example, in accordance with the present invention, a one-way data structure such as a bloom filter may be used to store information related to a threat and for correlating detected alerts. Because one-way data structures such as bloom filters can be written to with data and checked to determine whether specifically known data has been previously written, but cannot be read to reveal what data has been written, these structures can be provided to other collaborating systems without revealing the information contained therein. Other types of data structures that do reveal such information may also be used when appropriate. When alerts are correlated, the alert correlator may indicate a threat. Any suitable response to the threat may then be taken, and information about the threat may be provided to other collaborating systems. This information may include a "profile" of the attack that enables the recipient of the information to infer the intent of the attacker and respond accordingly.

The alert distributor uses an efficient technique to group collaborating systems and then pass data between certain members of those groups according to a schedule. In this way data can be routinely distributed without generating excess traffic loads. For example, the alert distributor may be used to exchange one-way data structures (e.g., bloom filters) or non-one-way data structure between collaborating systems. When such structures are received, the structures may be compared to determine whether there is a correlation of alert information between data structures. If there is, a threat may be indicated and any suitable action taken. For example, other collaborating systems may be alerted to the presence of the threat.

In one embodiment, the invention provides a method for detecting a threat to a computer, comprising: detecting a first intrusion attempt; storing information related to the first intrusion attempt in a one-way data structure; detecting a second intrusion attempt; checking the one-way data structure to determine whether stored information related to the first intrusion attempt correlates with the second intrusion attempt; and indicating that a threat is present when the stored information related to the first intrusion attempt correlates with the second intrusion attempt.

In a second embodiment, the invention provides a method for detecting a threat to a computer, comprising: receiving a one-way data structure from a collaborating system that contains information related to a first intrusion attempt; detecting a second intrusion attempt; checking the one-way data structure to determine whether stored information related to the first intrusion attempt correlates with the second intrusion attempt; and indicating that a threat is present when the stored information related to the first intrusion attempt correlates with the second intrusion attempt.

In a third embodiment, the invention provides a method for detecting a threat to a computer, comprising: receiving a data structure from a collaborating system that contains information related to a first intrusion attempt; receiving an indication of a characteristic of the collaborating system; detecting a second intrusion attempt; checking the data structure to determine whether stored information related to the first intrusion attempt correlates with the second intrusion attempt; and, based on the characteristic of the collaborating system, indicating that a threat is present when the stored information related to the first intrusion attempt correlates with the second intrusion attempt.

In a fourth embodiment, the invention provides a system for detecting intrusion attempts, comprising: an intrusion detection system that detects a first intrusion attempt and a second intrusion attempt; and an alert correlator that receives information related to the first intrusion attempt, that stores the information in a one-way data structure, that checks the one-way data structure to determine whether stored information related to the first intrusion attempt correlates with the second intrusion attempt, and that indicates that a threat is present when the stored information related to the first intrusion attempt correlates with the second intrusion attempt.

In a fifth embodiment, the invention provides a system for detecting intrusion attempts, comprising: an alert distributor that receives a one-way data structure from a collaborating system, wherein the one-way data structure contains stored information relating to a first intrusion attempt; an intrusion detection system that detects a second intrusion attempt; and an alert correlator that receives information related to the second intrusion attempt, that checks the one-way data structure to determine whether the stored information related to the first intrusion attempt correlates with the second intrusion attempt, and that indicates that a threat is present when the stored information related to the first intrusion attempt correlates with the second intrusion attempt.

In a sixth embodiment, the invention provides a system for detecting intrusion attempts, comprising: an alert distributor that receives a data structure from a collaborating system, wherein the data structure contains stored information relating to a first intrusion attempt, and that receives an indication of a characteristic of the collaborating system; an intrusion detection system that detects a second intrusion attempt; and an alert correlator that receives information related to the second intrusion attempt, that checks the data structure to determine whether the stored information related to the first intrusion attempt correlates with the second intrusion attempt, and that, based on the characteristic of the collaborating system, indicates that a threat is present when the stored information related to the first intrusion attempt correlates with the second intrusion attempt.

BRIEF DESCRIPTION OF THE DRAWINGS

The present invention is now illustrated in connection with the accompanying drawings in which like references refer to like parts throughout and in which:

FIG. 6 is an illustration of a table showing an example of different types of bloom filters and corresponding inputs that may be used in accordance with certain embodiments of the present invention;

DETAILED DESCRIPTION OF THE PREFERRED EMBODIMENTS

Figure 1:
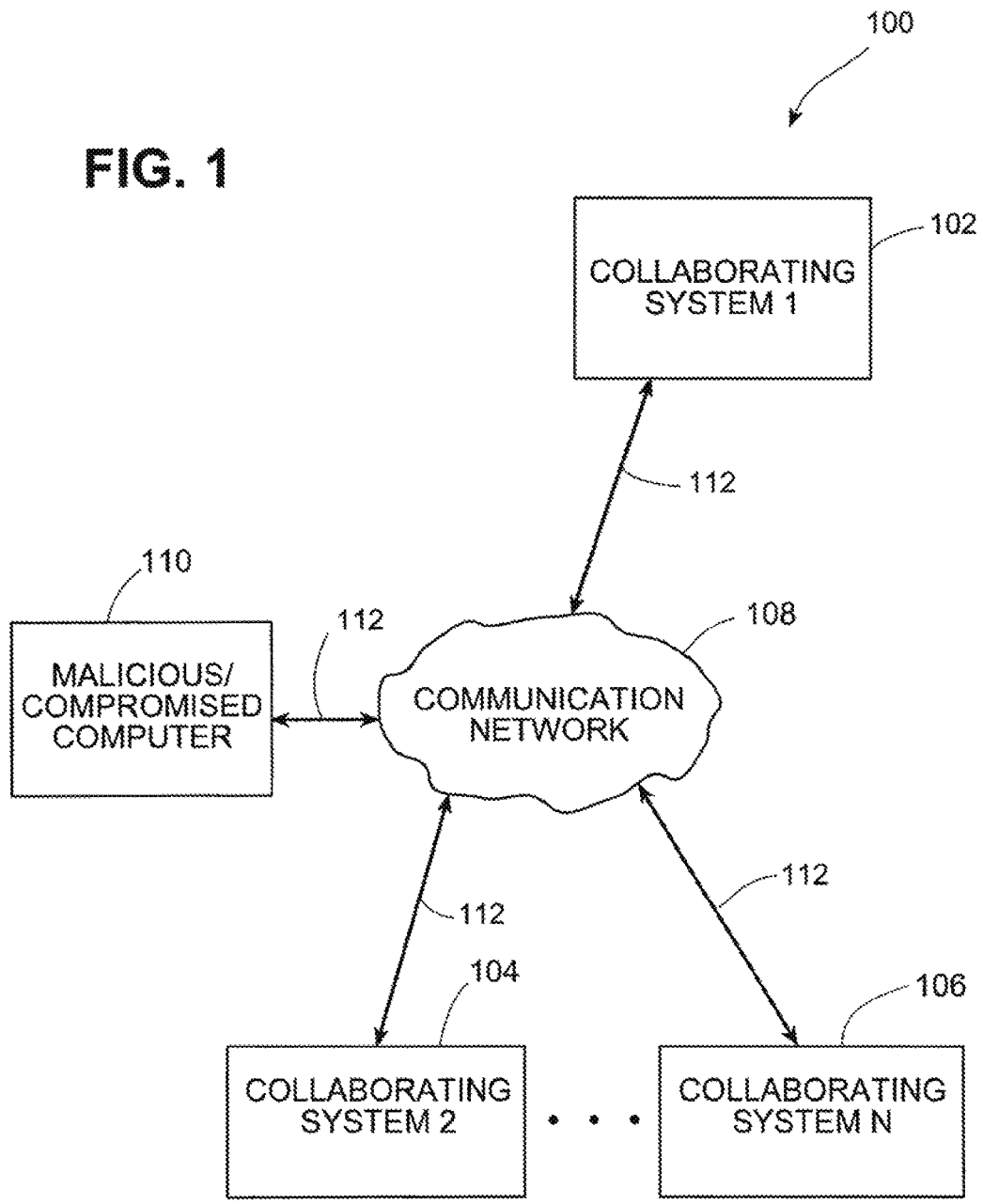
FIG. 1 is a block diagram of a system for implementing certain embodiments of the present invention.

FIG. 1 illustrates one embodiment of a system 100 in which the present invention may be implemented. As shown, system 100 includes multiple collaborating computer systems 102, 104, and 106, a communication network 108, a malicious/compromised computer 110, and communication links 112.

Collaborating systems 102, 104, and 106 may be systems owned, operated, and/or used by universities, businesses, governments, non-profit organizations, families, individuals, and/or any other suitable person and/or entity. As set forth more fully in connection with FIG. 2, collaborating systems 102, 104, and 106 may include any number of user computers, servers, firewalls, routers, switches, gateways, wireless networks, wired networks, intrusion detection systems, alert correlator systems, alert distributor systems, and any other suitable devices. Any number (including only one) of collaborating systems 102, 104, and 106 may be present in system 100, and systems 102, 104, and 106 may be identical or different.

Communication network 108 may be any suitable network for facilitating communication among computers, servers, etc. For example, communication network 108 may include private computer networks, public computer networks (such as the Internet), telephone communication systems, cable television systems, satellite communication systems, wireless communication systems, any other suitable networks or systems, and/or any combination of such networks and/or systems.

Malicious/compromised computer 110 may be any computer, server or other suitable device for launching a computer threat such as a virus, worm, trojan, etc. The owner of malicious/compromised computer 110 may be any university, business, government, non-profit organization, family, individual, and/or any other suitable person and/or entity. The owner of computer 110 may not be aware of what operations computer 110 is performing or may not be in control of computer 110. Computer 110 may be acting under the control of another computer or autonomously based upon a previous computer attack which infected computer 110 with a virus, worm, trojan, etc. Alternatively, computer 110 may be operated by an individual or organization with nefarious intent. Although only one malicious/compromised computer 110 is shown, any number of computers 110 may be present in system 100.

Communication links 112 may be any suitable mechanism for connecting collaborating systems 102, 104, and 106 and malicious/compromised computer 110 to communication network 108. Links 112 may be any suitable wired or wireless communication link, such as a T1 or T3 connection, a cable modem connection, a digital subscriber line connection, a WiFi or 802.11(a), (b), or (g) connection, a dial-up connection and/or any other suitable communication link. Alternatively, communication links 112 may be omitted from system 100 when appropriate, in which case systems 102, 104, and/or 106 and/or computer 110 may be connected directly to network 108.

Figure 2:
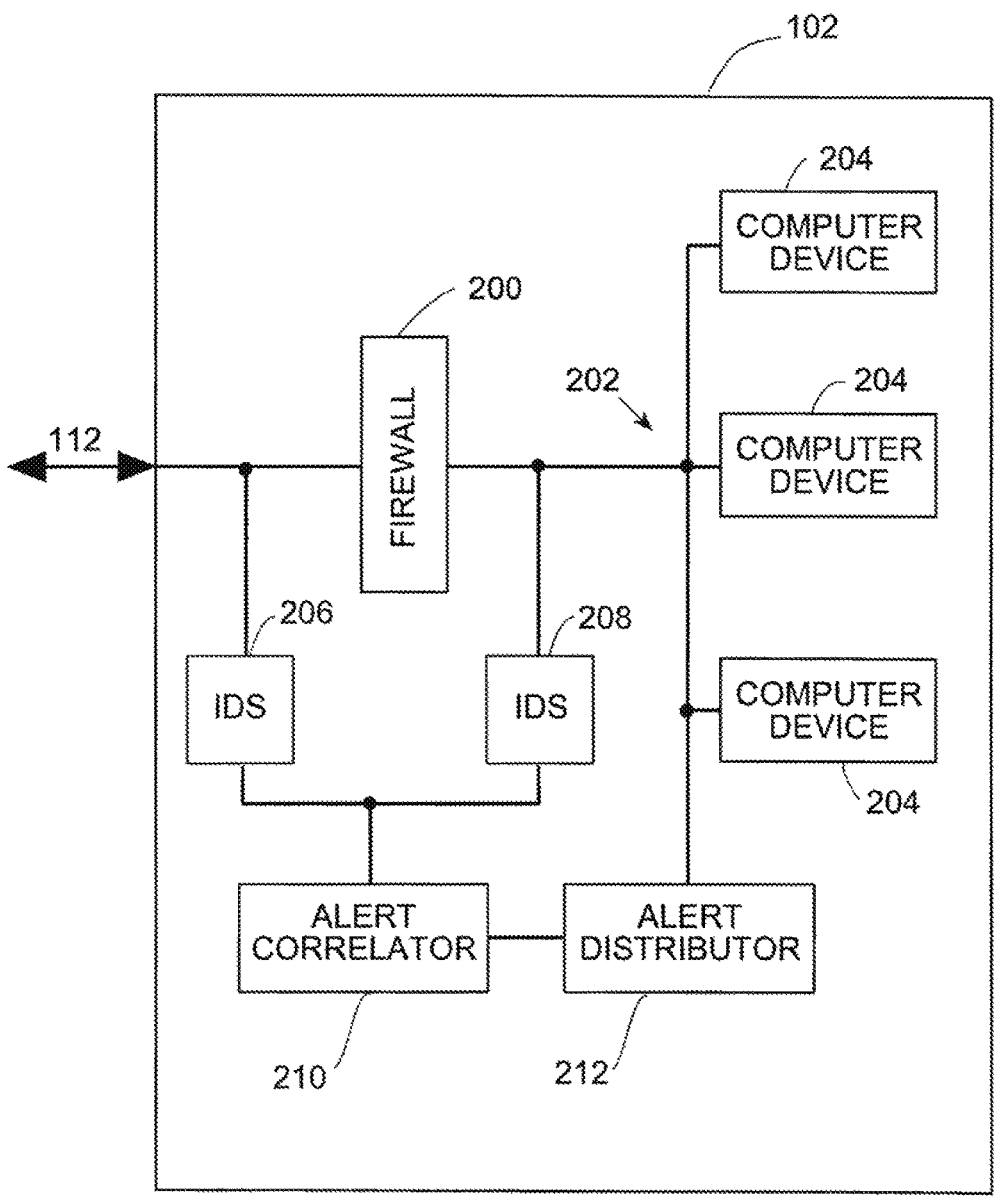
FIG. 2 is a block diagram of a collaborating system in accordance with certain embodiments of the present invention.

Turning to FIG. 2, one example of a collaborating system 102, 104, and 106 (illustrated as collaborating system 102) is described in more detail. As shown, system 102 may include a firewall 200, an internal network 202, one or more computer device 204, one or more intrusion detection systems 206 and 208, an alert correlator 210, an alert distributor 212, and any other suitable device, or any subset of these devices. Firewall 200 may be any suitable hardware and/or software firewall as known in the art. Internal network 202 may be any suitable wired or wireless computer network, buss, communication link, etc. as known in the art. Computer devices 204 may be any suitable computer, server, personal digital assistant, handheld computer, wireless phone, other wireless device, or any other device or combination of devices. Intrusion detection system (IDS) 206 may be any suitable hardware and/or software for detecting intrusion attempts outside firewall 200, such as Antura Recon from System Detection Inc., New York, N.Y. Intrusion detection system (IDS) 208 may be any suitable hardware and/or software for detecting intrusion attempts inside firewall 200, such as a honey pot or an anomalous payload detection system as described in US Patent Application Nos. 60/518,742 and 60/551,732, respectively filed Nov. 12, 2003 and Mar. 9, 2004, both of which are hereby incorporated by reference herein in their entirety.

Alert correlator 210 and alert distributor 212 may be any suitable hardware and/or software for performing the functions described herein. For example, correlator 210 and distributor 212 may be implemented on personal computer executing the Linux operating system, a database, and software to implement the corresponding correlation and distribution functions described herein. As illustrated in FIG. 2, alert correlator 210 may receive input from IDS 206 and/or IDS 208. By receiving input from IDS 206, which is outside firewall 200 in system 102, alert correlator 210 may be able to process all alerts that reach system 102, not just alerts corresponding to those threats that pass through firewall 200. Alerts that do pass through the firewall, or are generated internally to system 102, may additionally or alternatively be detected by IDS 208 and passed to alert correlator 210.

As known in the art, the sub-systems 200-212 of system 102 may be implemented as separate devices or may be implement as functions being performed in one device, or any number of devices.

Figure 3:
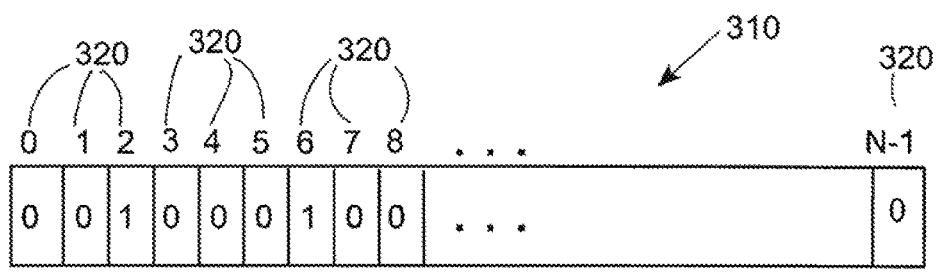
FIG. 3 is an illustration of a bloom filter in accordance with certain embodiments of the present invention.
Figure 4:
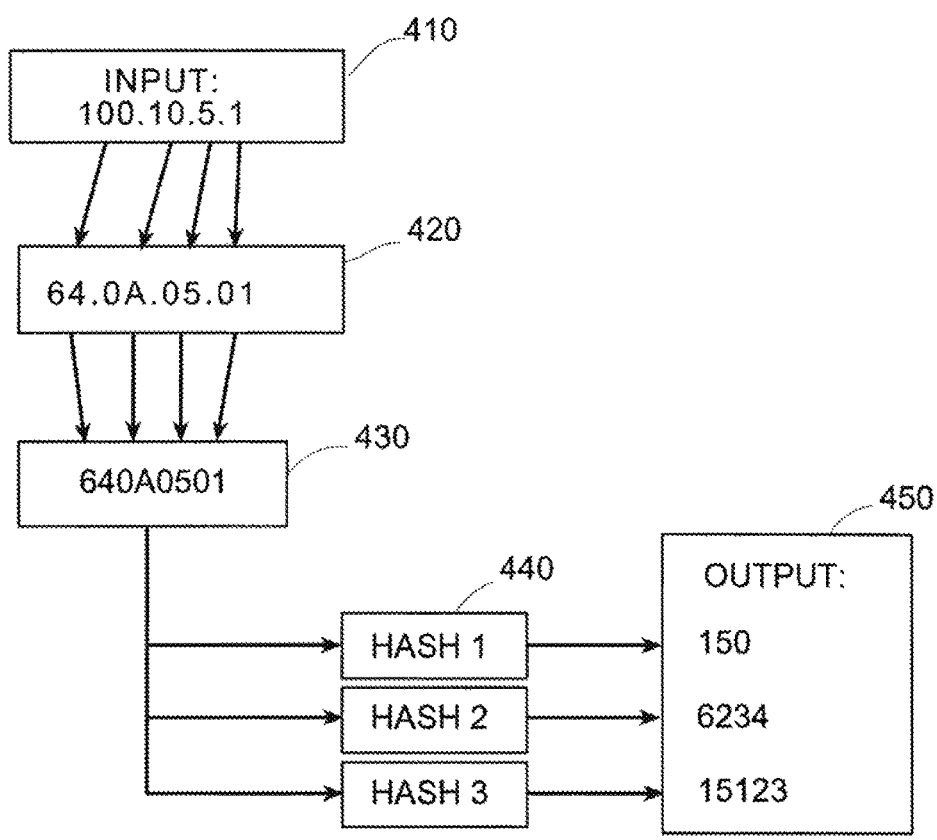
FIG. 4 is a flow diagram showing one example of converting an IP address to a set of hash values in accordance with certain embodiments of the present invention.
Figure 5:
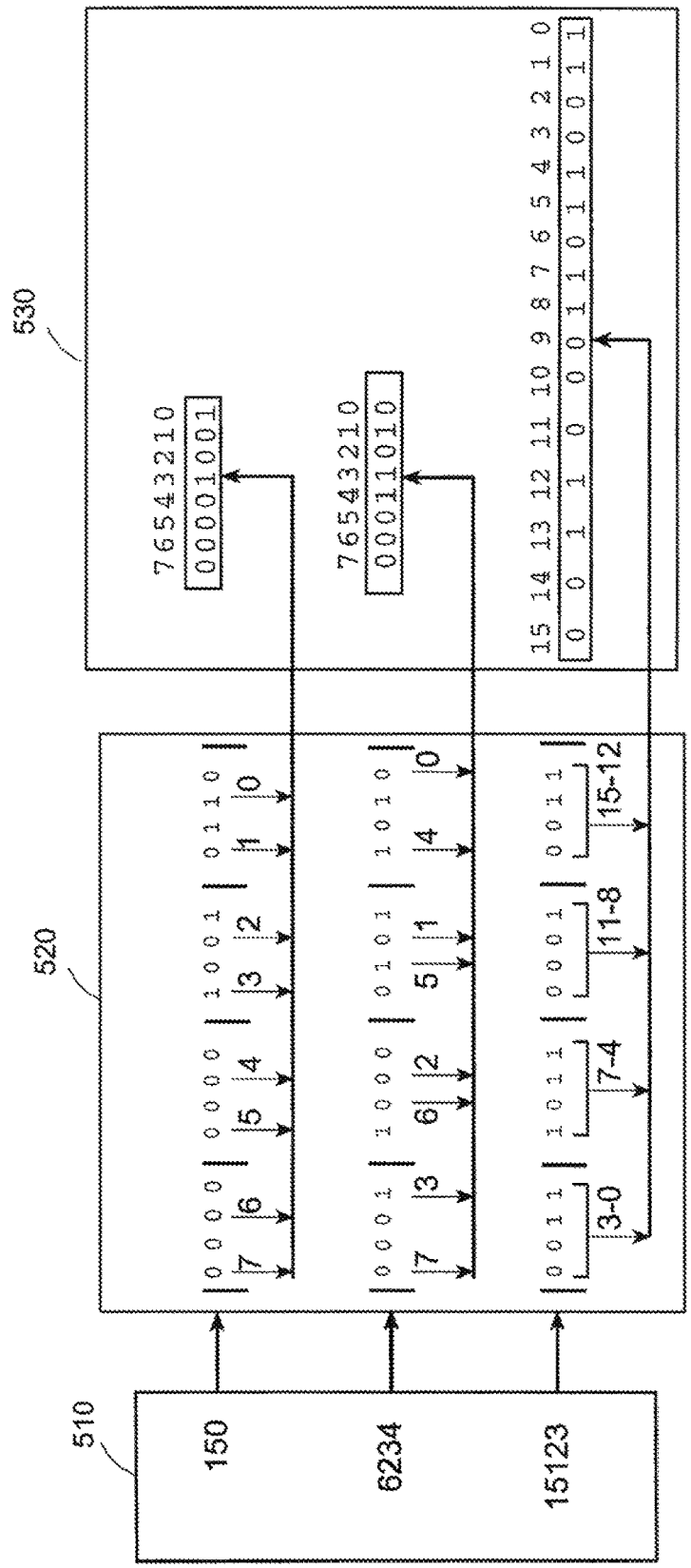
FIG. 5 is a flow diagram showing one example of converting a set of hash values to indexes to a bloom filter in accordance with certain embodiments of the present invention.

FIGS. 3, 4, and 5 illustrate example bloom filters and how they may be used in connection with the present invention. Although the present invention is illustrated in the figures as being implemented using bloom filters, any suitable one-way or non-one-way data structure may be used in accordance with the present invention. For example, in instances when keeping stored data (e.g., IP addresses) hidden is not critical, non-one-way data structures (e.g., trees, arrays, etc.) may be used in accordance with the invention. For example, government entities may not mind having IP addresses of potential attackers exchanged between them. In such cases, an array may be used instead of a bloom filter, and the IP address of a potential threat may be encoded (using a reversible technique) and used to index the array. The arrays may be filled with the same data that is stored in the bloom filter (e.g., zero, one, or a value representative of information related to a threat), and may be associated with the type of threat as shown in FIG. 6, as described below.

As shown in FIG. 3, a bloom filter may be implemented as an N-bit word 310. For example, N may be in the range of $2^{15}$ to $2^{20}$. When first initialized, all bits 320 in the bloom filter may be set to zero. Based on the alerts that are detected, certain bits in the bloom filter (e.g., bits 2 and 6) may then be set to one.

Turning to FIGS. 4 and 5, an example of steps for setting bits in a bloom filter based upon an input IP address are shown. As illustrated in FIG. 4, after an IP address 100.10.5.1 is received at step 410, the components of the IP address may first be converted to hexadecimal form—i.e., 64.0A.05.01—at step 420. These components may then be combined together to form one word—i.e., 640A0501—at step 430. This combined word may than be hashed using any one or more hashing algorithms (as known in the art) at step 440. For example, as shown, three hashing algorithms may be used. As illustrated, the outputs of the hashing algorithms may be any corresponding numbers—e.g., 150, 6234, and 15123—at step 450. As illustrated in FIG. 5, these numbers (as shown at step 510) may be converted to binary form as 0000000010010110, 0001100001011010, and 0011101100010011, respectively (as shown at step 520). Next, different parts of these binary numbers may be selected for the bloom filter indexes (as shown at step 530). For example, as illustrated, alternating bits of the binary form of the number 150 may be selected to form an index 00001001, half of the bits of the binary number 6234 may be rearranged to form an index 00011010, and each nibble of the binary number 15123 may be rearranged to form an index 0011000110110011. These indexes may then be used to select bits to be set or reset in the bloom filter based upon whether a threat corresponding to the input data (e.g., an IP address) has been detected or not.

By selecting multiple hashes of the same input and using multiple hash-bit-selection and hash-bit-rearrangement techniques, the bloom filters are more resilient to noise and data saturation. Although particular hash selection, hash-bit-selection, and hash-bit-rearrangement techniques are shown in FIG. 5, any suitable configuration of hash selection and hash-bit-selection and hash-bit-rearrangement techniques, including not rearranging the hash bits, may be used in accordance with the present invention.

In certain embodiments of the present invention, it may be desirable to use different bloom filters for storing information for different purposes. For example, as shown in table 600 of FIG. 6, different bloom filters numbered 1 through n (see column 610) may be used to store alerts corresponding to all collaborating systems, bank collaborating systems, government collaborating systems, internal attacks, external attacks, port 80 attacks, scan alerts, non-scan alerts, login attacks, today's attacks, yesterday's attacks, and/or any other suitable characteristics of the exchanged alerts (see column 620). The inputs to these bloom filters may be the source IP address corresponding to an alert or threat, a signature corresponding to an alert or threat, or any other suitable data (see column 630).

Although setting and resetting of bits in the bloom filters may be used to indicate the presence or non-presence of a threat, in certain embodiments of the invention, instead of setting and resetting bits, larger data values may also be used in the bloom filters to store information. For example, when no threat is present, the value may still be set to zero, but when a threat is present, the value may be set to the size of a datagram associated with the threat, the port number being targeted by the threat, a measure of the "stealthiness" of the threat, and/or any other suitable information. By properly encoding the values being stored, any suitable data or combination of data may be stored in a bloom filter. Obviously, using bit values in the bloom filter has the advantage of keeping the data structure smaller that if other size values were stored, thereby speeding-up data distribution.

In this way, the present invention not only correlates attacks, but it also develops a "profile" of the attacks. This profile information may be useful to a collaborating system in inferring the intent of an attack and determining how to respond to a detected attack. For example, if a collaborating system is operated by a bank, and an attack has been detected from an IP address on other banks, but no other collaborating systems, the bank may respond by blocking all traffic from a corresponding IP address at its firewall, contact suitable authorities, etc. Whereas with an attack that is being detected by a wide variety of types collaborating systems (e.g., banks, universities, and governments), the bank may simply decide to filter traffic based upon a signature of the threat.

Figure 7:
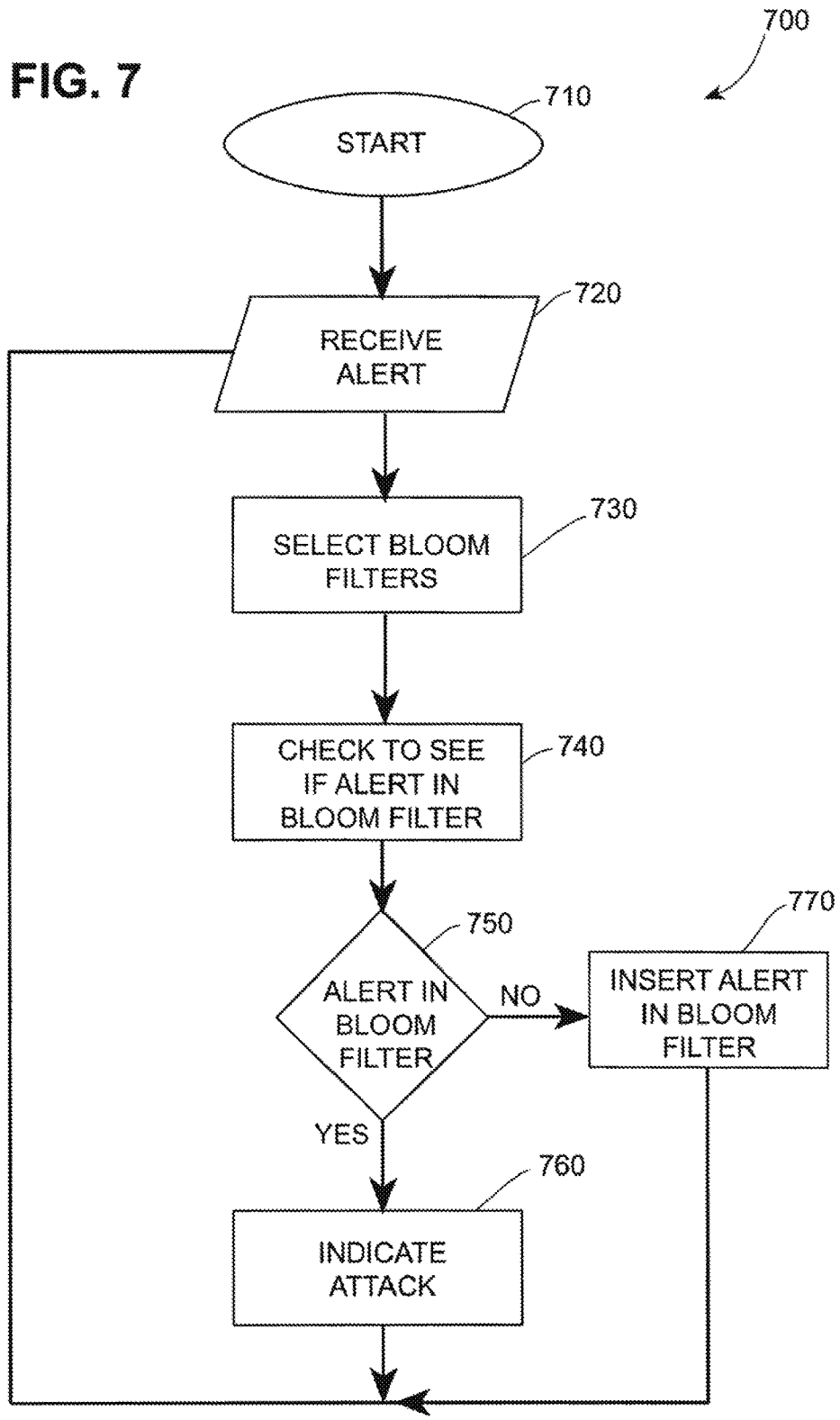
FIG. 7 is a flow diagram of an alert correlator process in accordance with certain embodiments of the present invention.

FIG. 7 illustrates a process 700 that may be performed by alert correlator 210. As shown, after process 700 begins at step 710, the process waits for and receives an alert at step 720 from IDS 206 or 208. This may be accomplished by retrieving the alert from a database connected to or part of IDS 206 or IDS 208. This alert may be generated by an IDS 206 or 208, and may be indicative of any type of reconnaissance, attack, or anomalous activity. Once an alert has been received, process 700 may select one or more bloom filters corresponding to the alert at step 730. For example, as illustrated in FIG. 6, one bloom filter may be provided for attacks on port 80, another bloom filter may be provided for scan alerts, yet another bloom filter may be provided for all alerts, etc. By providing different bloom filters for different types of attacks, the bloom filter may be able to provide a "profile" of the attack—that is, if a bloom filter indicates a possible attack, and the bloom filter is a "scan attack" bloom filter, the profile of the attack is known to include that the alert is a "scan attack." Next at step 740, process 700 may determine whether a corresponding alert has been previously entered in any of the selected bloom filters. An example of such a sub-process is described below in connection with FIG. 8. The check may be made to determine whether an alert is correlating with a previous alert from the same system or whether an alert is correlating with a previous alert from another system based, for example, on which bloom filters are selected. If the alert is determined to have been found in a bloom filter, at step 750, process 700 branches to step 760 where any suitable response to an attack may be taken. For example, at step 760, process 700 may attempt to defend its local system (e.g., system 102) from the attack by: alerting a system administrator of an attack; shutting-down firewall 200; blocking all traffic from the corresponding IP address; generating a firewall filter rule based on a datagram of the threat, a signature of the threat, an IP address of threat, the destination port targeted, and/or the datagram length associated with the threat; and/or performing any other suitable action known in the art. Process 700 may also attempt to help other collaborating systems (e.g., systems 104 or 106) defend against the attack by alerting other collaborating systems 104 and 106 of the attack by providing them with a firewall filter rule and/or information about the attack, such as the kind of attack (e.g., scanning, probing, etc.), a datagram of the threat, a signature of the threat, an IP address of the attack, the destination port/service targeted, the length of the datagram associated with the threat, type of other collaborating systems that have detected the threat, a measure of the "stealthiness" of the threat, and/or any other profile information related to the threat that may be useful in preventing, detecting, responding to, and/mitigating the effects of the attack.

If the alert is determined not to have been found in a bloom filter, at step 750, process 700 branches to step 770 where the alert is entered into the selected bloom filters. An example of such a sub-process is described below in connection with FIG. 9.

Figure 8:
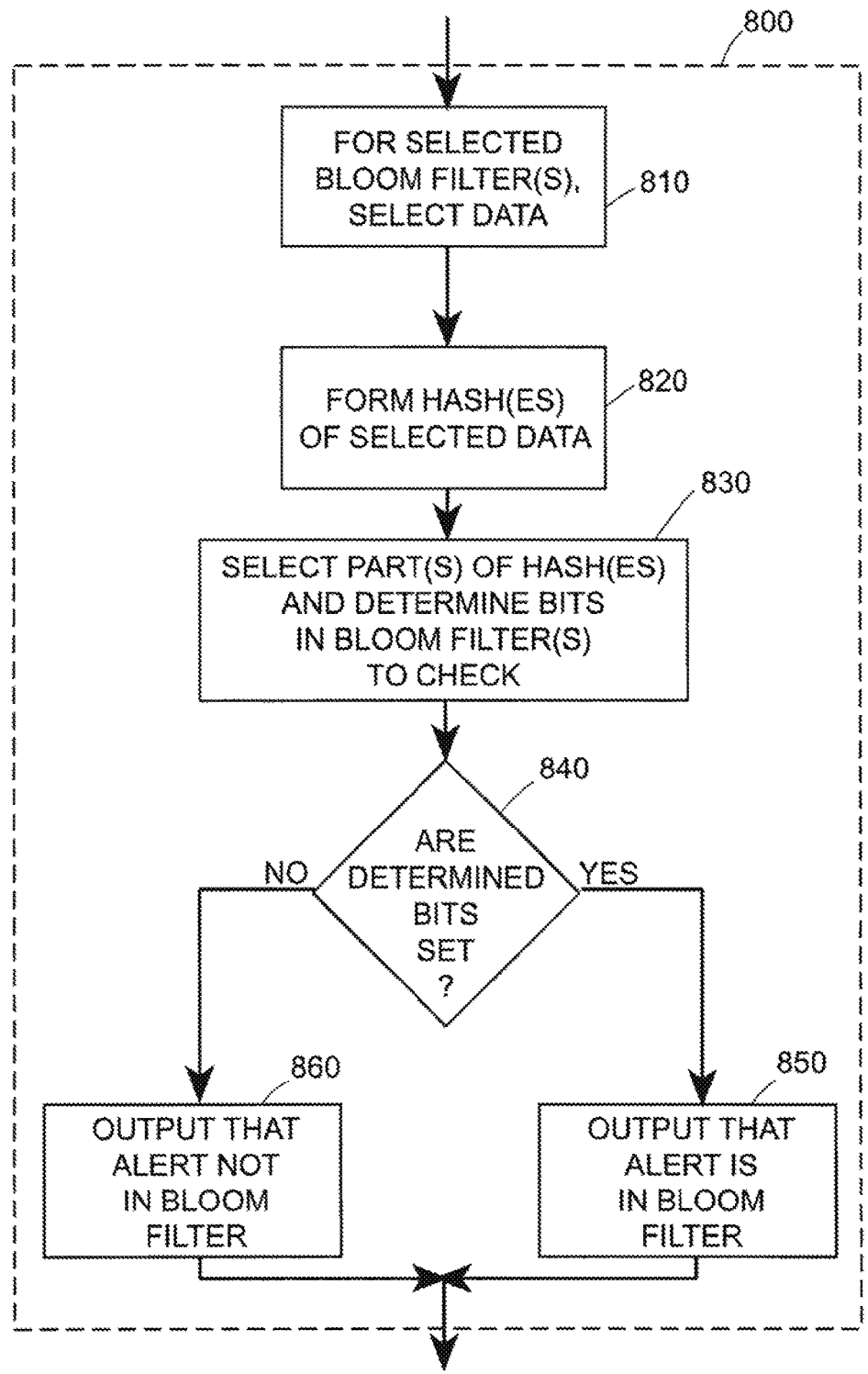
FIG. 8 is a flow diagram of a bloom filter checking process in accordance with certain embodiments of the present invention.

Turning to FIG. 8, a sub-process 800 corresponding to step 740 for determining whether a corresponding alert has been previously entered in any of a set of selected bloom filters is shown. As illustrated, at step 810, for each selected bloom filter, sub-process 800 selects the data to be used for that bloom filter. For example, for bloom filter 1 in FIG. 6, as shown in column 630, the input data is the source IP address corresponding to the alert or threat. Next, at step 820, sub-process 800 forms one or more hashes of the selected data. Any suitable hashing functions known in the art may be used in step 820, such as SHA-1, MD-5, etc. Sub-process 800 then may select one or more parts of the hashes and, based on the selected parts of the hashes, determine which bits in the bloom filters need to be checked. The specific hash functions and parts of the hash functions to be used may be kept as a shared secret among the collaborating systems. Next, at step 840, the bits in the bloom filters are checked, and if the bits are not already set, then sub-process 800 branches to step 860 which outputs that a corresponding alert has not been found in the bloom filters. Otherwise, sub-process 800 branches to step 850 which outputs that a corresponding alert has been found in the bloom filters.

Figure 9:
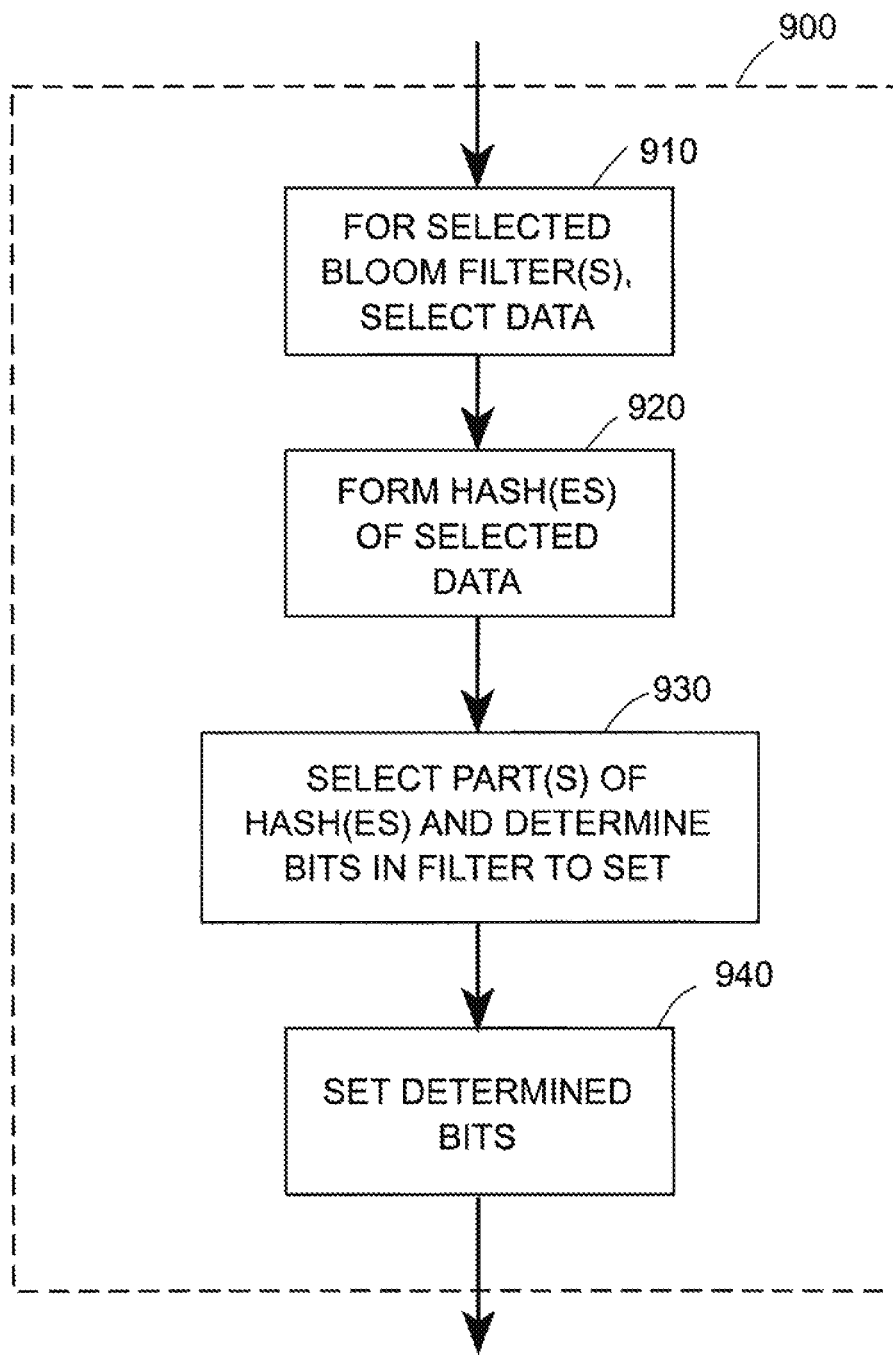
FIG. 9 is a flow diagram of a bloom filter insertion process in accordance with certain embodiments of the present invention.

As shown in FIG. 9, a sub-process 900 corresponding to step 770 for inserting an alert into a bloom filter is illustrated. Beginning at step 910, sub-process 900 selects the data to be used as inputs for the selected bloom filters. For example, for bloom filter 1 in FIG. 6, as shown in column 630, the input data is the source IP address corresponding to the alert or threat. Next, at step 920, hashes of this data are formed, as described above. Then, at step 930, the sub-process selects one or more parts of the hashes and determines which bits in the bloom filter to set, as also described above. Finally, at step 940, the determined bits are set in the bloom filters.

Figure 10:
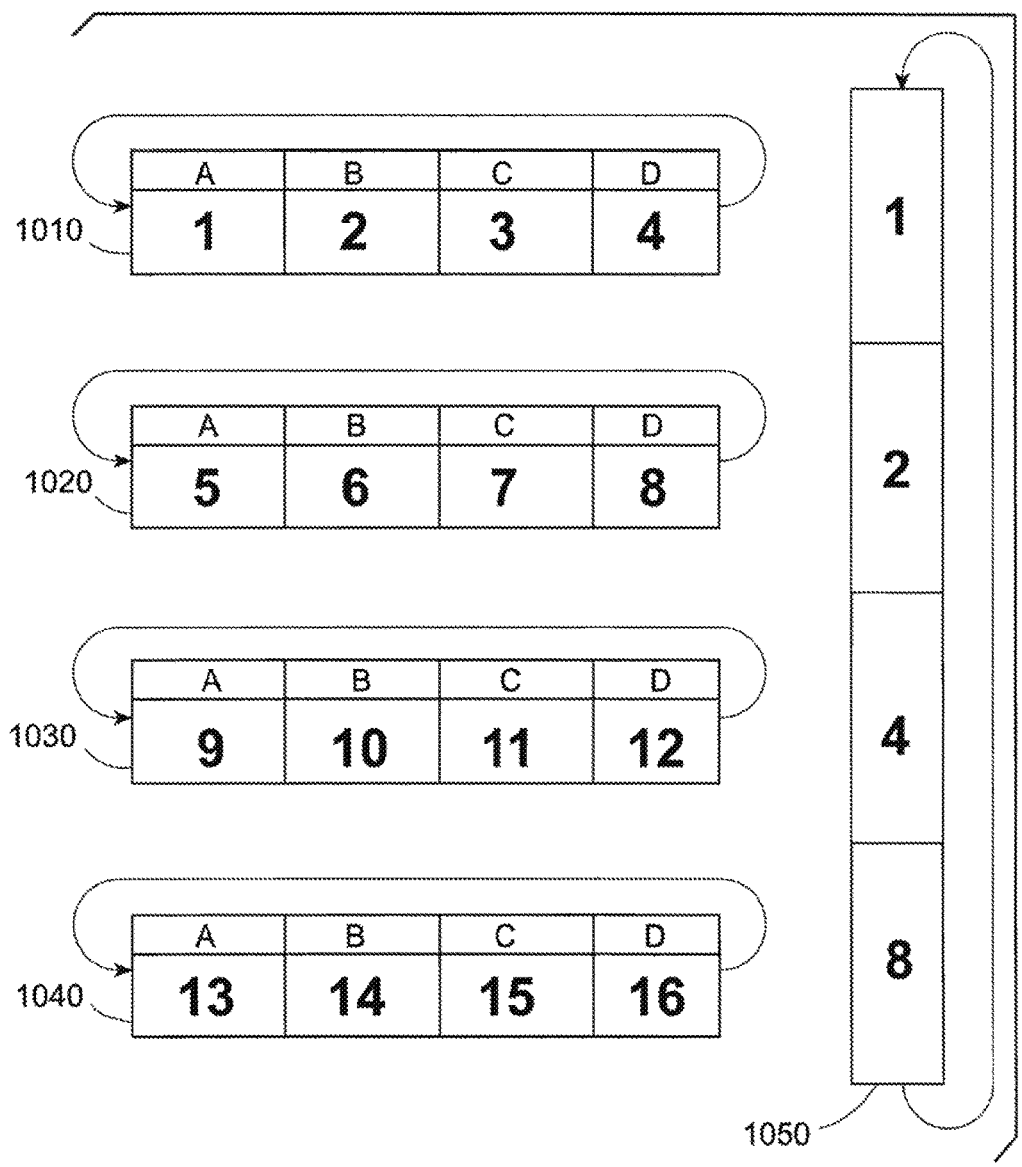
FIG. 10 is a block diagram of an alert distributor process in accordance with certain embodiments of the present invention.
Figure 11:
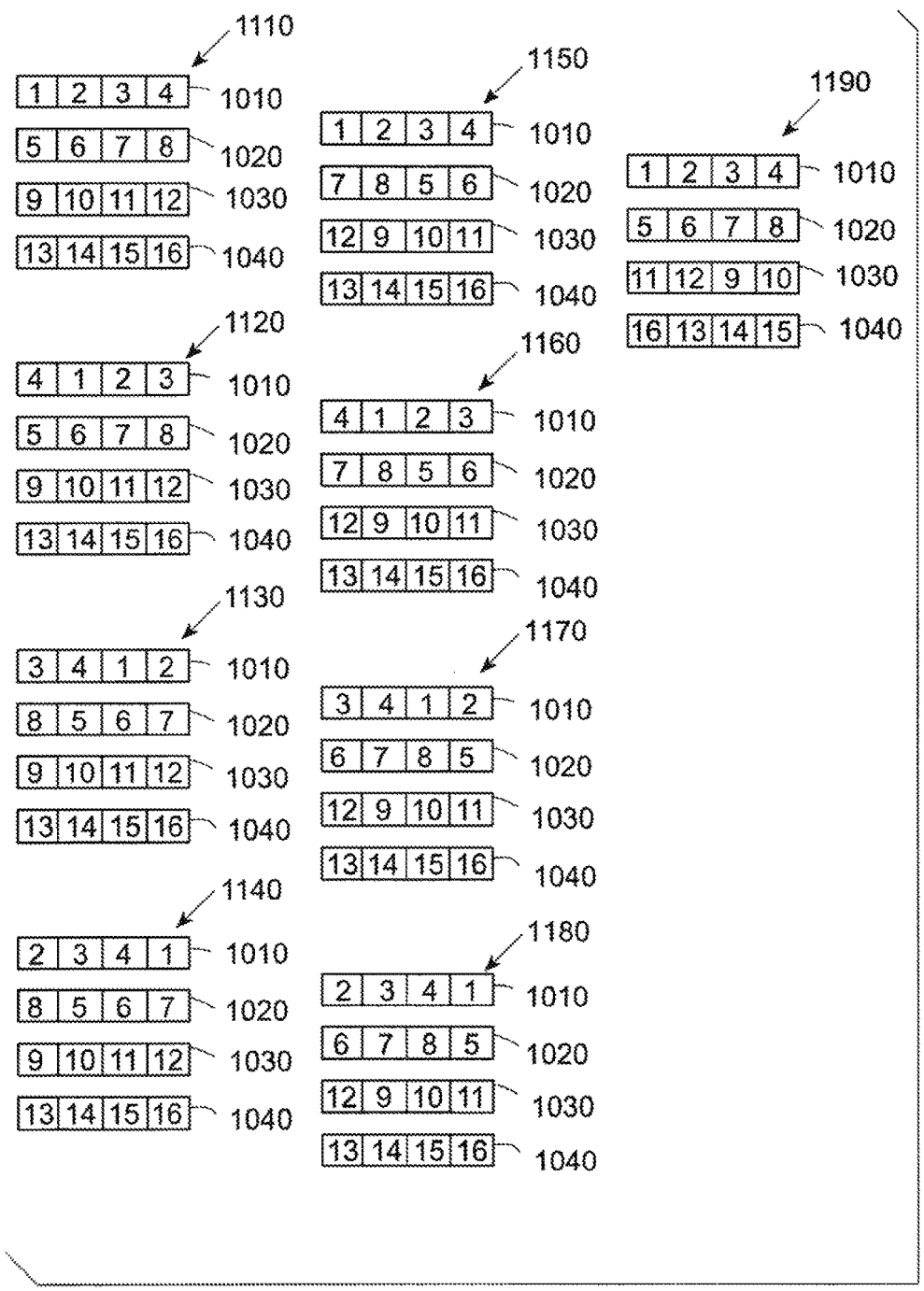
FIG. 11 is an illustration of different states of an alert distributor process in accordance with certain embodiments of the present invention.
Figure 12:
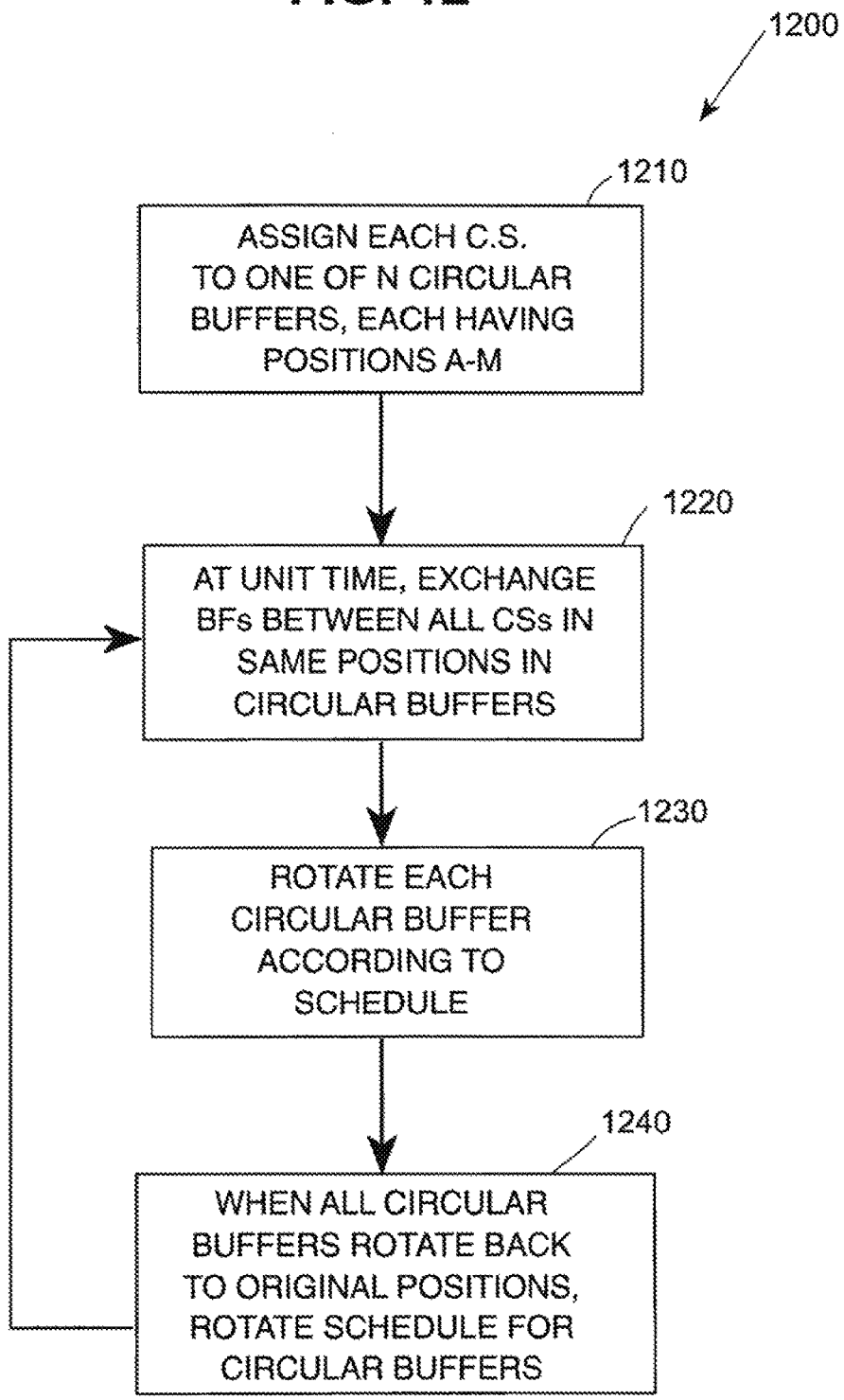
FIG. 12 is a flow diagram of an alert distributor process in accordance with certain embodiments of the present invention.

As stated above, an alert distributor 212 may be used to distribute alert information, such as bloom filters, between collaborating systems. Although any suitable data distribution mechanism, such as a peer-to-peer network or a central server for storage and retrieval, may be used in accordance with the present invention, in order to securely and efficiently distribute this information, the distribution mechanism illustrated in FIGS. 10-12 is preferably used. As shown in FIG. 10, any number of circular buffers 1010-1040 may be used to form groups of collaborating systems. For example, buffer 1010 groups collaborating systems 1, 2, 3, and 4, buffer 1020 groups collaborating systems 5, 6, 7, and 8, buffer 1030 groups collaborating systems 9, 10, 11, and 12, and buffer 1040 groups collaborating systems 13, 14, 15, and 16. Each collaborating system identified in the same position A, B, C, or D in buffers 1010-1040 is considered to be in the same family. For example, collaborating systems 1, 5, 9, and 13 are in the same family, systems 2, 6, 10, and 14 are in the same family, systems 3, 7, 11, and 15 are in the same family, and systems 4, 8, 12, and 16 are in the same family. At least once each unit time (which may be any suitable period of time, e.g., one second, two minutes, half hour, etc.), each member of a family exchanges alert information (e.g., bloom filters) with other members of that family. This exchange may be done using any suitable technique. In order to prevent false bloom filters from being distributed by nefarious computers, the bloom filters may be digitally signed by the senders and then verified by the recipients.

Another circular buffer 1050 having as many positions as there are circular buffers 1010-1040 may be used to indicate the rotation rate for buffers 1010-1040. For example, as shown, circular buffer 1050 has four positions corresponding to the four circular buffers 1010-1040, and these positions are filled with numbers 1, 2, 4, and 8 indicating that buffers 1010, 1020, 1030, and 1040 will advance one position every 1, 2, 4, and 8 units time, respectively. Obviously, any suitable rotation rates could be used in accordance with the present invention. For example, buffer 1040 may be advanced one position every ten units time, buffer 1030 may be advanced one position every nine units time, buffer 1020 may be advanced one position every eight units time, and buffer 1010 may be advanced one position every seven units time. Preferably, the rotation schedule is difficult to guess or predict. Each time the least frequently rotating buffer (e.g., buffer 1040) has completed a full rotation and returned to its original order, circular buffer 1050 will advance one position to cause the next buffer (e.g., buffer 1010) to become the least frequently rotating buffer.

Turning to FIG. 11, an illustration of the rotation process is shown. As can be seen, circular buffers 1010-1040 are in their original positions in state 1110. Next at state 1120, circular buffer 1010 has advanced one position. At state 1130, circular buffer 1010 has rotated a total of two positions and buffer 1020 has advanced one position. Next at state 1140, circular buffer 1010 has rotated a total of three positions. At state 1150, circular buffer 1010 has completed a full rotation and returned to its original position, circular buffer 1020 has advanced a total of two positions, and circular buffer 1030 has advanced one position. This process continues through states 1160, 1170, 1180, 1190, and other states not shown until circular buffers 1010-1040 return to the positions shown in state 1110, at which point the process repeats itself.

Although FIGS. 10 and 11 illustrate four circular buffers 1010-1040, each containing four positions, any suitable number of circular buffers containing any suitable number of positions may be used in accordance with the present invention. For example, N (e.g., nine) circular buffers may be used, and each buffer may contain IN (e.g., three) positions. Moreover, although circular buffers are described herein, any suitable data structure that facilitates associating groups and families of collaborating systems may be used in accordance with the invention.

This distribution process is illustrated as a process 1200 in FIG. 12. Beginning at step 1210, process 1200 assigns each collaborating system to one of N circular buffers, each having a position A through M. This assignment may be performed, for example, by performing a hash function on each collaborating system's IP address to provide a circular buffer number to which the collaborating system should be assigned. Next, at step 1220, at each unit time, process 1200 exchanges bloom filters between all collaborating systems in the same positions A through M. In order to prevent false bloom filters from being distributed by nefarious computers, the bloom filters may be digitally signed by the senders and then verified by the recipients. Then at step 1230, process 1200 rotates each circular buffer according to the corresponding schedule for that buffer. Finally, at step 1240, when all circular buffers have rotated back to their original positions, process 1200 rotates the schedule for rotating the N circular buffers and returns to step 1220.

To further protect the security and anonymity of the data being exchanged by the collaborating systems, a central authority may operate a trusted proxy server or other data exchange mechanism that is used to exchange data between the systems. In this way, no collaborating system would be able to determine the IP address of a collaborating system from which it is receiving information. In such a case, however, the central authority may assign and the collaborating systems may know the category or type of system (e.g., a bank, university, government, etc.) with which it is exchanging data. This category may be based on SIC codes or any other suitable mechanism. In this way, the systems would be better able to evaluate a profile of a threat and thereby infer the intent of the threat. The central authority may also assign encryption keys used by the collaborating systems. Furthermore, the central authority may provide the same alert correlation and alert distribution functions described herein as being performed by the collaborating systems. In such a case, it may not be necessary to hide data (e.g., IP addresses of possible threats) being provided to the central authority by each collaborating system because the authority is trusted to maintain that data in confidence.

Figure 13:
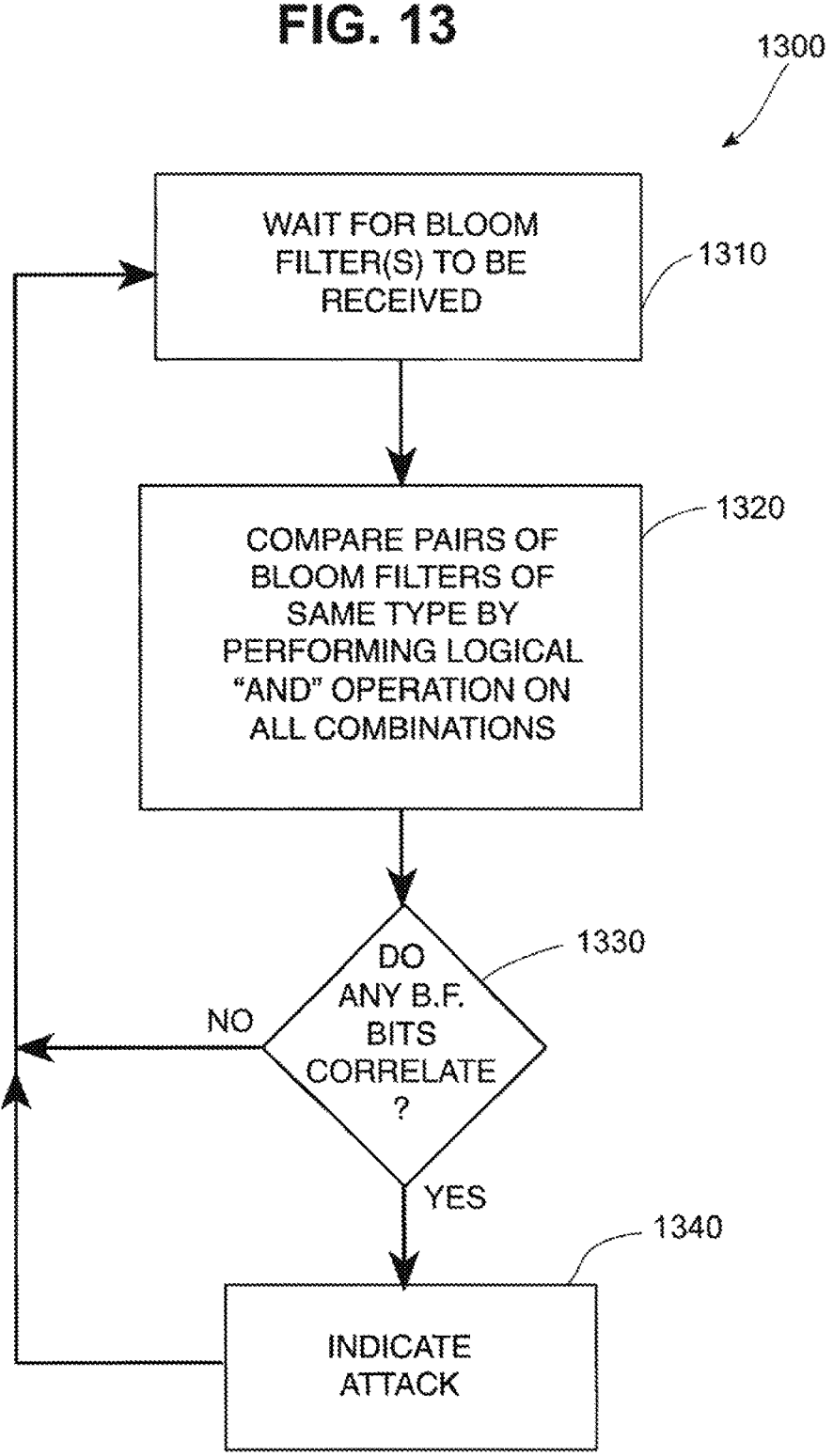
FIG. 13 is a flow diagram of a process for processing bloom filters received from an alert distributor process in accordance with certain embodiments of the present invention.

FIG. 13 is a flow diagram of a process 1300 that may be used to process bloom filters received at a collaborating system by way of an alert distributor. As shown, at step 1310, process 1300 waits for a bloom filter to be received. These bloom filters may replace bloom filters previously received from the same source collaborating system. These bloom filters may also be checked as part of the process illustrated in FIGS. 7 and 8. Next, at step 1320, the process compares pairs of bloom filters of the same type for like alerts by performing a logical "AND" operation. Any resulting set bits may indicate a potential threat. As step 1330, process 1300 determines whether any bloom filter bits correlate, and if not, the process loops back to step 1310. Otherwise, process 1300 branches to step 1340 where an attack may be indicated using any suitable technique as described above. For example, a collaborating system may attempt to defend its local system (e.g., system 102) from the attack by: alerting a system administrator of an attack; shutting-down firewall 200; blocking all traffic from the corresponding IP address; generating a firewall filter rule based on a datagram of the threat, a signature of the threat, an IP address of threat, the destination port targeted, and/or the datagram length associated with the threat; and/or performing any other suitable actions known in the art. A collaborating system may also attempt to help other collaborating systems (e.g., systems 104 or 106) defend against the attack by alerting other collaborating systems 104 and 106 of the attack by providing them with a firewall filter rule and/or information about the attack, such as the kind of attack (e.g., scanning, probing, etc.), a datagram of the threat, a signature of the threat, an IP address of the attack, the destination port/service targeted, the length of the datagram associated with the threat, type of other collaborating systems that have detected the threat, a measure of the "stealthiness" of the threat, and/or any other profile information related to the threat that may be useful in preventing, detecting, responding to, and/or mitigating the effects of the attack.

In order to prevent false alerts due to bloom filter saturation, the filters may be periodically cleared. Alternatively, instead of using bits with a value of one to represent specific alerts, the bloom filters may use a time value representative of the date or time that an alert has been detected. Then, over time, the value may be updated when a correlating alert is detected or the value may be set to zero when no correlating alert is detected. When suitable, the time value may be combined with other data in the bloom filter and decoded as appropriate.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

What is claimed is:

1. A method of detecting a threat to a computer system in a plurality of collaborating computer systems, the method comprising:
   receiving, at a first computer system, a first bloom filter from a collaborating second computer system, the first bloom filter representing encrypted first data relating to a source of a first intrusion attempt detected by an intrusion detection system of the collaborating second computer system;
   detecting, by the first computer system, a second intrusion attempt;
   producing a second bloom filter by performing a cryptographic function on second data relating to a source of the second intrusion attempt that results in an output value having a plurality of digits and using a subset of the plurality of digits of the output value as an index to the second bloom filter, wherein the subset does not include all of the plurality of digits of the output value;
   determining whether the second intrusion attempt correlates with the first intrusion attempt by comparing the first bloom filter and the second bloom filter; and
   indicating that a threat is present if the second intrusion attempt is determined to correlate with the first intrusion attempt,
   wherein receiving the first bloom filter from the collaborating second computer system comprises: grouping the collaborating second computer system and other collaborating systems into groups so that each collaborating system in a group occupies a position in that group;
   exchanging bloom filters between collaborating systems in the same position in the different groups; and rotating the position occupied by each member of at least one of the groups according to a schedule.

2. The method of claim 1, wherein the encrypted first data relates to the source of the first intrusion attempt through a hash function.

3. The method of claim 1, wherein the cryptographic function is a hash function.

4. The method of claim 1, wherein the cryptographic function is an encryption function.

5. A system of detecting a threat to a computer system in a plurality of collaborating computer systems, the system comprising:
   at least a portion of a communication network;
   a first computer system that is coupled to the at least a portion of the communication network and that is configured to:
   receive a first bloom filter from a collaborating second computer system, the first bloom filter representing encrypted first data relating to a source of a first intrusion attempt detected by an intrusion detection system of the collaborating second computer system;
   detect a second intrusion attempt;
   produce a second bloom filter by performing a cryptographic function on second data relating to a source of the second intrusion attempt that results in an output value having a plurality of digits and using a subset of the plurality of digits of the output value as an index to the second bloom filter, wherein the subset does not include all of the plurality of digits of the output value;
   determine whether the second intrusion attempt correlates with the first intrusion attempt by comparing the first bloom filter and the second bloom filter; and
   indicate that a threat is present if the second intrusion attempt is determined to correlate with the first intrusion attempt,
   wherein when receiving the first bloom filter from the collaborating second computer system, the first computer system is configured to: group the collaborating second computer system and other collaborating systems into groups so that each collaborating system in a group occupies a position in that group; exchange bloom filters between collaborating systems in the same position in the different groups; and rotating the position occupied by each member of at least one of the groups according to a schedule.

6. The system of claim 5, wherein the encrypted first data relates to the source of the first intrusion attempt through a hash function.

7. The system of claim 5, wherein the cryptographic function is a hash function.

8. The system of claim 5, wherein the cryptographic function is an encryption function.

9. A non-transitory computer readable medium containing computer executable instructions that, when executed by a processor, cause the processor to perform a method of detecting a threat to a computer system in a plurality of collaborating computer systems, the method comprising:

receiving, at a first computer system, a first bloom filter from a collaborating second computer system, the first bloom filter representing encrypted first data relating to a source of a first intrusion attempt detected by an intrusion detection system of the collaborating second computer system;

detecting, by the first computer system, a second intrusion attempt;

producing a second bloom filter by performing a cryptographic function on second data relating to a source of the second intrusion attempt that results in an output value having a plurality of digits and using a subset of the plurality of digits of the output value as an index to the second bloom filter, wherein the subset does not include all of the plurality of digits of the output value;

determining whether the second intrusion attempt correlates with the first intrusion attempt by comparing the first bloom filter and the second bloom filter; and indicating that a threat is present if the second intrusion attempt is determined to correlate with the first intrusion attempt, wherein receiving the first bloom filter from the collaborating second computer system comprises: grouping the collaborating second computer system and other collaborating systems into groups so that each collaborating system in a group occupies a position in that group; exchanging bloom filters between collaborating systems in the same position in the different groups; and rotating the position occupied by each member of at least one of the groups according to a schedule.

10. The non-transitory computer readable medium of claim 9, wherein the encrypted first data relates to the source of the first intrusion attempt through a hash function.

11. The non-transitory computer readable medium of claim 9, wherein the cryptographic function is a hash function.

12. The non-transitory computer readable medium of claim 9, wherein the cryptographic function is an encryption function.

* * * * *